March 18, 1947.  W. L. REMICK  2,417,660
HYDRAULIC SEPARATION OF SOLIDS
Filed May 23, 1942  5 Sheets-Sheet 1

Inventor
Walter L. Remick
By Ogle R. Singleton
Attorney

March 18, 1947.   W. L. REMICK   2,417,660
HYDRAULIC SEPARATION OF SOLIDS
Filed May 23, 1942   5 Sheets-Sheet 3

Inventor
Walter L. Remick
By Ogle R. Singleton
Attorney

March 18, 1947. W. L. REMICK 2,417,660
HYDRAULIC SEPARATION OF SOLIDS
Filed May 23, 1942 5 Sheets-Sheet 4

Inventor
Walter L. Remick
By Ogle R. Singleton
Attorney

March 18, 1947.  W. L. REMICK  2,417,660
HYDRAULIC SEPARATION OF SOLIDS
Filed May 23, 1942  5 Sheets-Sheet 5

INVENTOR
WALTER L. REMICK,
BY
Charles V. Imlay
ATTORNEY

Patented Mar. 18, 1947

2,417,660

UNITED STATES PATENT OFFICE 2,417,660

HYDRAULIC SEPARATION OF SOLIDS

Walter L. Remick, Evanston, Ill.

Application May 23, 1942, Serial No. 444,272

12 Claims. (Cl. 209—12)

My invention consists in a new and useful improvement in hydraulic separation of solids, and is designed for separating materials of different specific gravities, more particularly fine or "slack" coal from its associated non-combustible materials. My improved process comprises the segregation of overflow and underflow products by hydraulic separation, in each of three stages of the process. The first stage is accomplished by the use of hydraulic classification in which the materials of different specific gravities become separated in a fluid medium, the density of which is controlled so as to facilitate the separation. The underflow product of this first stage is discharged to waste. A portion of the overflow product of this stage is a portion of the final product of my process. A portion of this overflow product of the first stage is the feed to that part of my improved apparatus whereby the second stage of my improved process is practiced. The second stage of my process is accomplished by the use of hydraulic classification in which the materials of different specific gravities become separated in upwardly flowing currents of water. The underflow product of this second stage is discharged to waste. A portion of the middling product of this second stage is a portion of the final product of my process. The residue of this middling product of the second stage is returned to that part of my improved apparatus whereby the first stage of my process is practiced. The overflow product of the second stage, united with the residue of the overflow product of the first stage, is the feed to that part of my improved apparatus whereby the third stage of my improved process is practiced. The third stage of my process is accomplished by the use of hydraulic separation in which the residue of material in the feed to the third stage is separated from the liquid to become the residue of the final product of my process. The particularly novel and useful features of my invention are the means for and the steps in the process of returning a portion of the product of the second stage for retreatment in the first stage whereby there is afforded means for more nicely controlling the density of the fluid medium for separation in the first stage, and the control of the water used for the hydraulic separation of all three stages, in circuits so nearly closed as to retain within the apparatus all the water except so much as is necessarily discharged with the finished products.

While I have hereinafter fully described my improved process and one specific embodiment of my improved apparatus for practicing my process, which is fully illustrated in the drawings filed herewith, it is to be distinctly understood that I do not consider my invention, either as to my improved process or my improved apparatus, to be limited by such disclosures, but refer for its scope to the claims appended thereto.

In the drawings:

Fig. 5 is a vertical section detail illustrating a modified form of sump for the first unit illustrated in Fig. 2.

Fig. 6 is a vertical section detail illustrating another modified form of sump for the first unit illustrated in Fig. 2.

Figure 2:
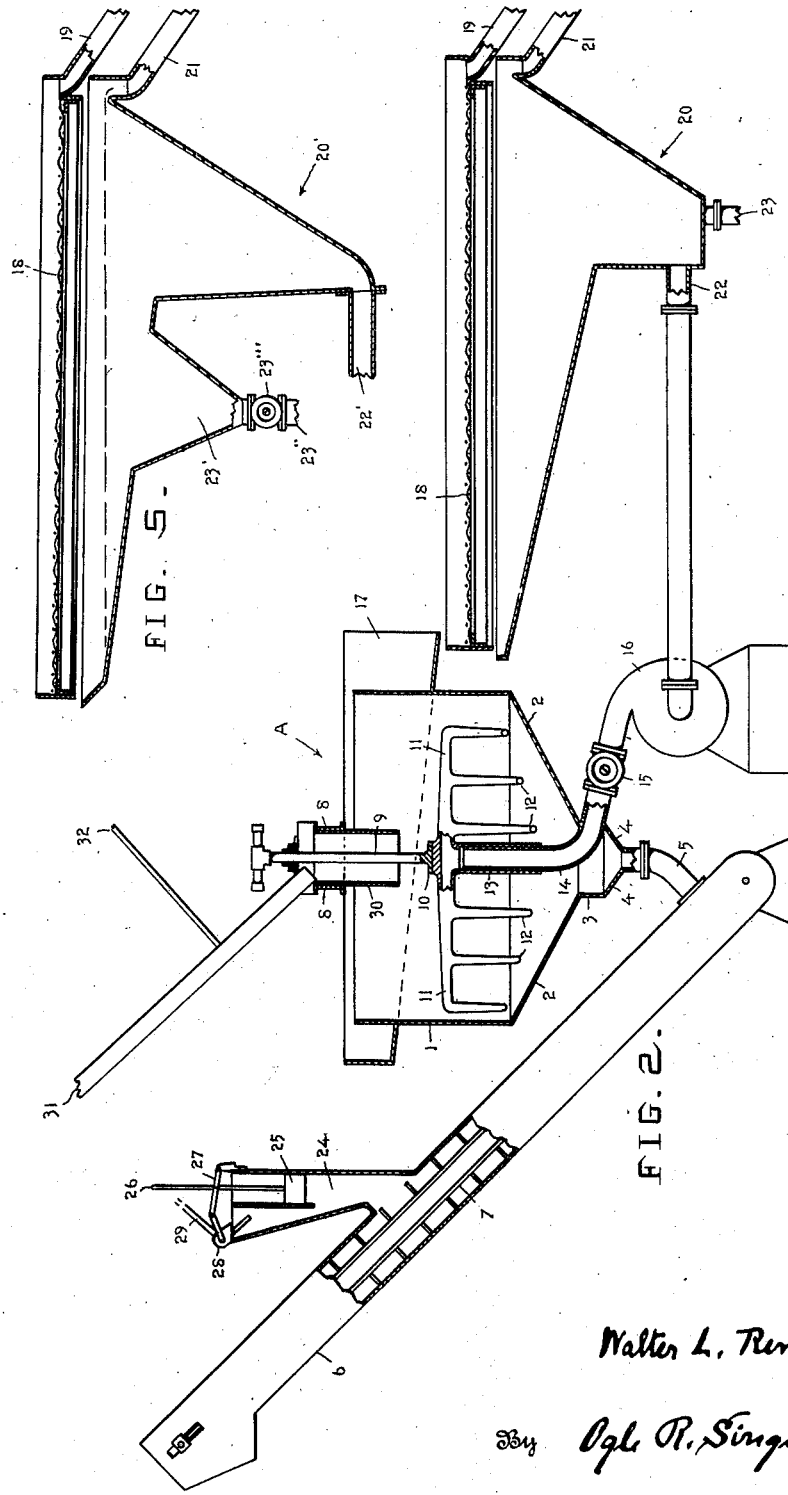
Fig. 2 is a vertical section of the first unit of my apparatus.

As illustrated in the drawings, my improved apparatus has the first unit A for the initial treatment of the mixed materials, the second unit B for the retreatment of the materials discharged from unit A, and the third unit C for retreatment of materials discharged from units A and B. Unit A (Fig. 2) has a cylindrical tank 1 with frusto-conical bottom 2 with a centrally disposed cylindrical chamber 3 having a frusto-conical bottom 4 from which depends a discharge pipe 5 communicating with the casing 6 of an endless conveyor 7. The tank 1 is provided across its top with beams 8 on which is suitably journaled a rotatable shaft 9 with head 10 from which radiates a series of pipes 11 provided with downwardly extending, tangentially disposed nozzles 12 adjacent the bottom 2 of the tank 1. The head 10 has a depending sleeve 13 in which is received a pipe 14, with valve 15, connected with the discharge side of the pump 16, and communicating with the head 10. The tank 1 has an overflow launder 17 which discharges onto a screen 18, with discharge pipe 19 therefrom, disposed over sump 20 having an overflow discharge pipe 21 and an underflow discharge pipe 22 and a second underflow discharge pipe 23. The pipe 22 communicates with the intake side of the pump 16. The casing 6 of the conveyor 7 has a water reservoir 24 with float 25 having a pitman 26 on lever 27 on valve 28 in pipe 29. The tank 1 has a cylindrical feed spout 30 supported by beams 8, concentric with tank 1. There is a feed chute 31 so disposed as to discharge the feed into spout 30. Suitably disposed relative to this chute 31 is the pipe 32 with spray heads (not shown) whereby water may be applied to the feed as it enters the tank 1.

Figure 3:
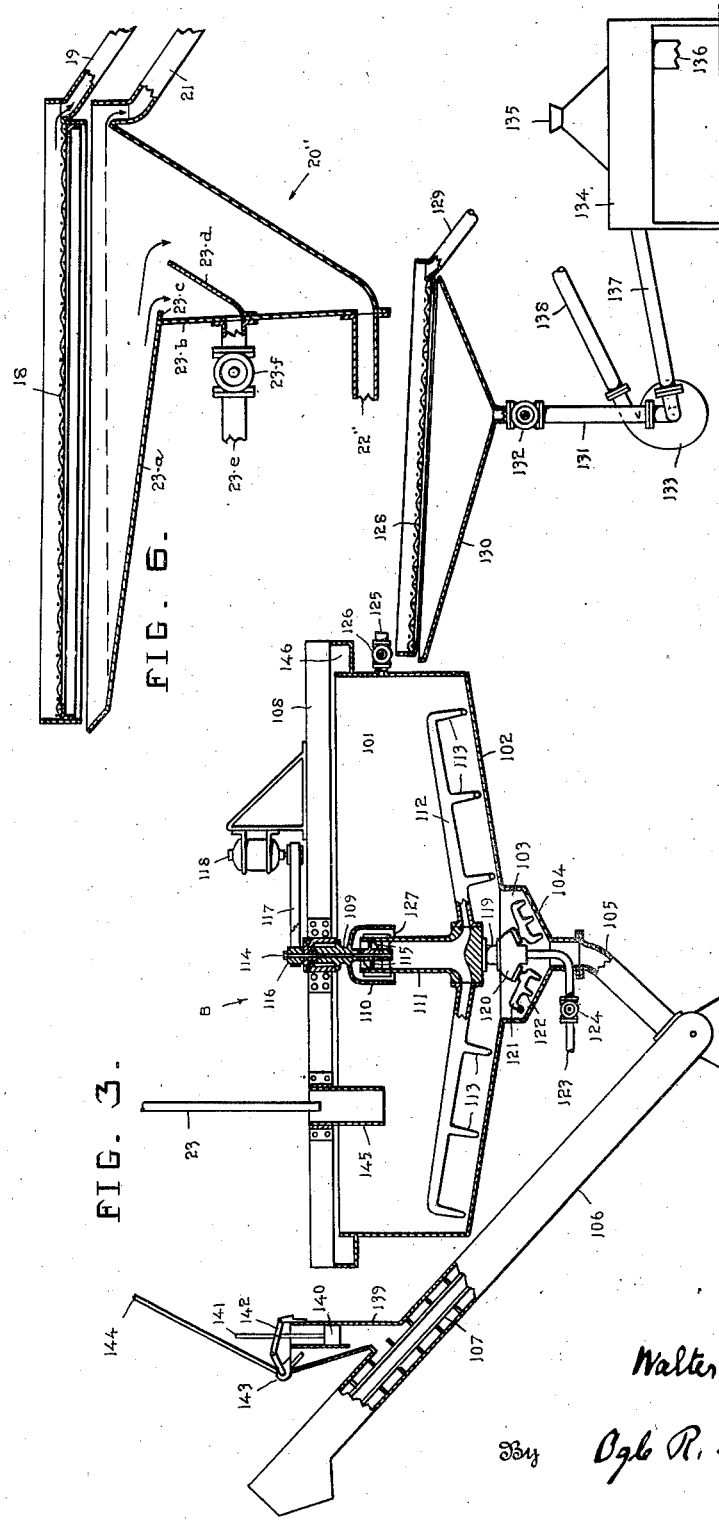
Fig. 3 is a vertical section of the second unit of my apparatus.

Unit B (Fig. 3) has a cylindrical tank 101 with a frusto-conical bottom 102 with a centrally disposed depending cylindrical chamber 103 having a frusto-conical bottom 104 from which depends a discharge pipe 105 communicating with the casing 106 of an endless conveyor 107. The tank 101 is provided across its top with beams 108 on which is journaled the rotatable shaft 109 with the depending tubular casing 110 extending into the tank 101. Suitably supported in this casing 110 is the depending concentric pipe 111 from which radiate pipes 112 connected with pipe 111 and having downwardly extending, tangentially disposed nozzles 113 adjacent the bottom 102 of tank 101. Suitably journaled in the shaft 109 and the pipe 111 is the shaft 114 provided with impeller 115 located in the upper portion of pipe 111, and also provided with pulley 116 connected by belt 117 with motor 118 mounted on the beams 108. The pipe 111 has a concentric, depending shaft 119 with head 120 from which radiate pipes 121 with nozzles 122 disposed adjacent the bottom 104 of the chamber 103. A pipe 123, with valve 124, passes through pipe 105, and into chamber 103, connected through head 120 with pipes 121. The tank 101 has a discharge pipe 125, with valve 126, the pipe 125 being disposed on the side of tank 101, in the horizontal plane of the intake 127 of the casing 110. Disposed below the discharge end of pipe 125 is the screen 128 with discharge pipe 129 therefrom. Located below the screen 128 is the sump 130 having its discharge pipe 131, with valve 132, connected with the intake side of pump 133. Adjacent this pump 133, there is a conventional form of drying device 134. This device 134 has a feed hopper 135 into which discharge the two previously described pipes, pipe 19 from the screen 18 of unit A, and pipe 129 from the screen 128 of unit B. The device 134 has a discharge means 136 for the dried product of the device, and a pipe 137 to convey the liquid removed from the product to the intake side of the pump 133. The discharge side of the pump 133 has a pipe 138 which discharges into the sump 20 of unit A. The casing 106 of the conveyer 107 has a water reservoir 139 with float 140 having a pitman 141 on lever 142 on valve 143 in pipe 144. The tank 101 has a cylindrical feed spout 145, supported on beams 108, into which discharges underflow pipe 23 from the bottom of the sump 20 of unit A. The tank 101 has an overflow launder 146 with discharge pipe 147 connected with the overflow pipe 21 from the sump 20 of unit A.

Figure 4:
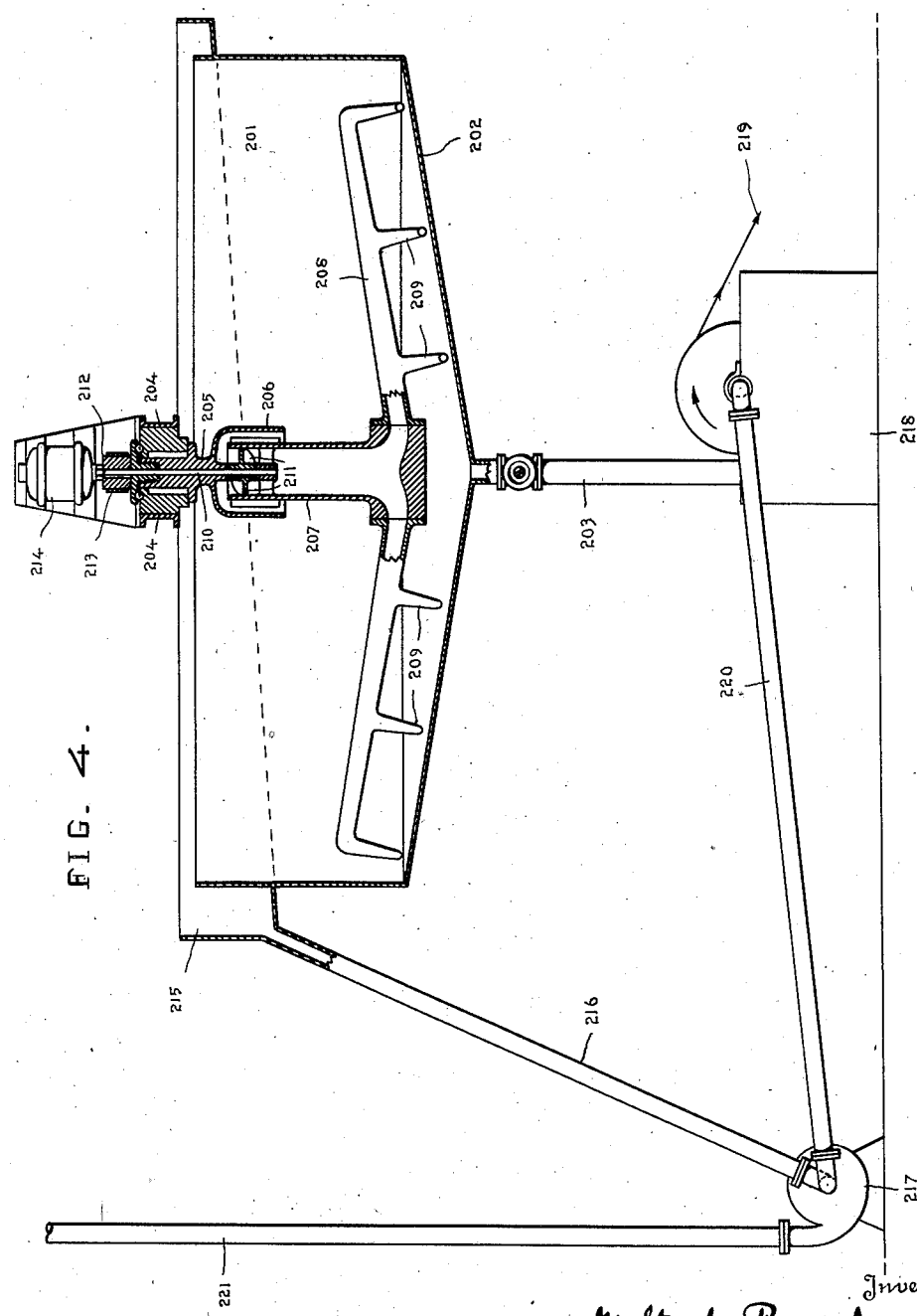
Fig. 4 is a vertical section of the third unit of my apparatus.

Unit C (Fig. 4) has a cylindrical tank 201 with frusto-conical bottom 202 with an underflow discharge pipe 203 depending therefrom. The tank 201 is provided across its top with beams 204 on which is suitably journaled the rotatable shaft 205 with depending tubular casing 206 extending into tank 201. Suitably supported in this casing 206 is the depending concentric pipe 207 from which radiate pipes 208 connected with pipe 207 and having downwardly extended, tangentially disposed nozzles 209 adjacent the bottom 202 of the tank 201. Suitably journaled in shaft 205 and pipe 207 is the shaft 210 provided with impeller 211, located in the upper portion of pipe 207, and also provided with pulley 212 connected by belt 213 with motor 214 mounted on the beams 204. The tank 201 has an overflow launder 215 with a discharge pipe 216 connected with the intake side of of a pump 217. The pipe 203 is connected with the intake side of a conventional filter 218 having the solid material discharge 219 and the liquid discharge pipe 220 connected with the intake side of the pump 217. The discharge side of the pump 217 has a pipe 221 which discharges into a tank 222 disposed above unit A, and it is to be noted that pipes 29, 32, 123 and 144 are so related to said tank 222 as to supply water from said tank 222, respectively, to reservoir 24 of unit A, to feed chute 31 of unit A, to chamber 103 of unit B, and to reservoir 139 of unit B.

Figure 7:
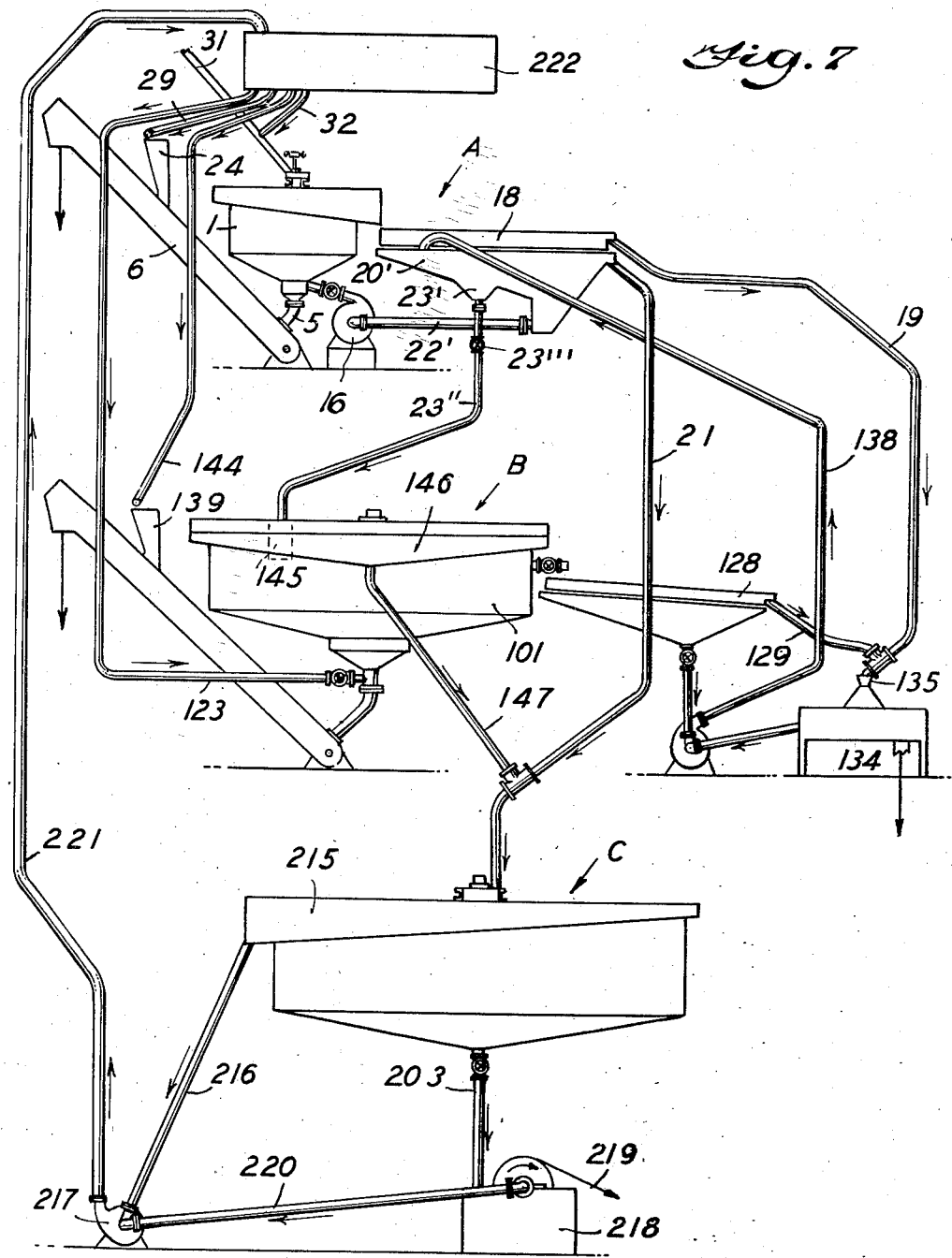
Fig. 7 is a diagrammatic view, similar to Fig. 1, illustrating the use, in the first unit, of the modified form of sump illustrated in Fig. 5.

In Fig. 5, there is illustrated a modified form of sump 20' for use in unit A. The sump 20' is disposed under the screen 18 with discharge pipe 19, and has the overflow discharge pipe 21. It has the underflow discharge pipe 22' serving the same purpose as the pipe 22 (Fig. 2), viz. it is connected with the intake side of the pump 16 of unit A (Fig. 7). The sump 20' of Fig. 5 differs from the sump 20 of Fig. 2, in that it does not have the underflow discharge pipe 23 connected with feed spout 145 of unit B, but the sump 20' is provided in its downwardly sloping bottom with a depending chamber 23' with an underflow discharge pipe 23'' which has a valve 23''', and is connected with feed spout 145 of unit B (Fig. 7).

In Fig. 6, there is illustrated another modified form of sump for use in unit A. The sump 20'' is disposed under the screen 18 with discharge pipe 19 and has the overflow discharge pipe 21. It has the underflow discharge pipe 22'' serving the same purpose as the pipe 22 (Fig. 2) and the pipe 22' (Fig. 5), viz. it is connected with the intake side of the pump 16 of unit A. The sump 20'' has the downwardly inclined bottom 23—a and the vertical wall 23—b, the portion 23—c of the bottom 23—a extending somewhat beyond the wall 23—b. A baffle plate 23—d extends outwardly and upwardly from the wall 23—b, its upper end being disposed in the plane of the bottom 23—a and spaced from the outer end of the portion 23—c. It is obvious (Fig. 6) that there is formed a small chamber in the side of the sump 20'', and from the lower end of this chamber opens pipe 23—e with valve 23—f. This pipe 23—e is connected with the feed spout 145 of unit B.

Figure 1:
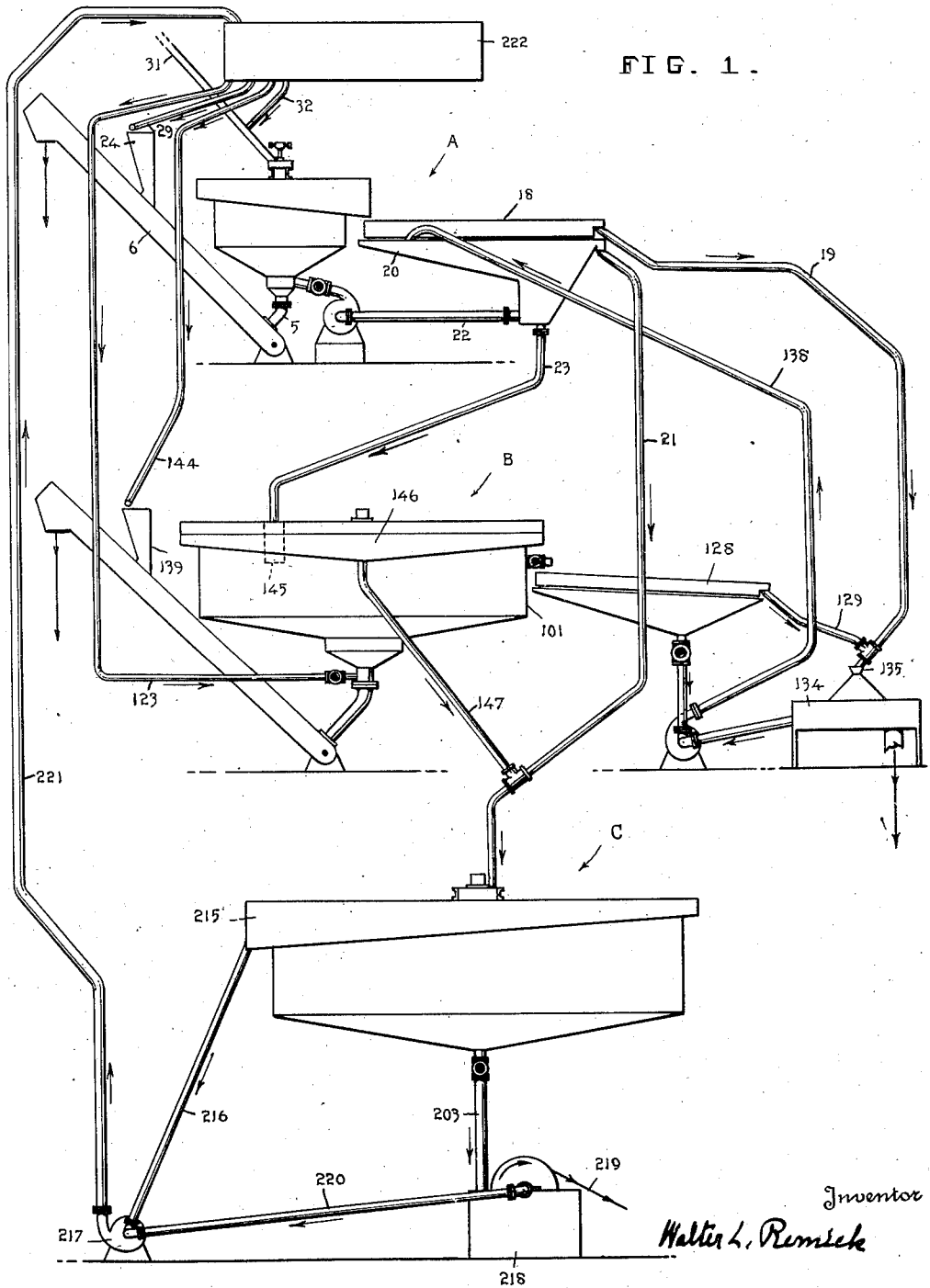
Fig. 1 is a diagrammatic view illustrating the relation of the several units of my improved apparatus and indicating the courses of liquid and materials in the practice of my improved process.

Having described the details of construction of my improved apparatus, I will now describe its use and operation in the practice of my improved process. For the purpose of illustration, I will describe an exemplary form of my apparatus designed to treat mixed materials, viz. coal and its associated non-combustible material, at a rate of 550 tons per hour. To handle this amount of feed, my apparatus comprises four units A, two units B, and one unit C. It will be understood that the supply and discharge means of the four units A, and the two units B are so arranged as to conform to the system illustrated diagrammatically in Fig. 1 of the drawings, to which reference is made to aid in an understanding of the following description of my improved process.

The units A, B and C are supplied with a suitable amount of water from the tank 222. It is assumed that the mixed materials to be separated have been passed through a screen of ½ inch openings and are fed to units A by chutes 31. As the materials pass along these chutes 31, they pass under spray heads which are supplied with water from tank 222 through the pipes 32. The materials entering tanks 1 of the units A are subjected to the treatment disclosed and claimed in United States Letters Patent Number 2,052,004, viz. "The classifying effect of an upwardly flowing current" from the nozzles 12, supplied by pump 16, causing rotation of head 10, pipes 11 and nozzles 12. The mass of overflowed particles passes through launders 17 and flows across the horizontal screens 18 having ⅛ inch openings. The particles which are larger than ⅛ inch and have overflowed from tanks 1 are the clean coal particles and these pass over the screens 18 and through pipes 19 to the drying device 134. It is to be particularly noted that as the overflowed mass passes over the screens 18, horizontal stratification of this mass occurs, the heavier particles sinking to pass through the screens 18, and the lighter fine particles tending to pass with the lighter coarse particles over the screens 18. In this way, much fine coal is obtained with the coarser coal, this fine coal being particles less than ⅛ inch in size, and passes out to the drying device 134, as the final desired product.

The particles which pass through the screens 18, slate and some of the fine coal, are received in the sumps 20. As will be presently explained, the screened middling products of units B are returned through pipes 138 to the sumps 20. A portion of the feed to sumps 20 is drawn by pumps 16, through pipes 22, and returned to tanks 1. Another portion of this feed flows from sumps 20 through pipes 23 to tanks 101 of units B.

The underflow product, slate particles, of tanks 1 of units A, settles through chambers 3 and discharge pipes 5 into casings 6 of the conveyors 7 to be discharged to waste.

It is to be particularly noted that variations in the density of the fluid circulated in tanks 1 of units A, caused by fluctuations in the quantity and quality of the mixed materials being fed to tanks 1, result in variations of the flow of water, through pipes 5, upwardly into tanks 1, supplied from reservoirs 24, according to the method disclosed and claimed in my co-pending application Serial Number 249,817. If, due to an increase in the quantity of the under-flow product in the feed, the density of the fluid is increased, the water levels in reservoirs 24 are caused to rise, raising floats 25, and thereby reducing the volume of water supplied to reservoirs 24, through pipes 29 from tank 222. This results in a decrease in the velocity of the upward currents through pipes 5 into tanks 1, permitting faster discharge of the underflow products of tanks 1. If, however, due to a decrease in the quantity of the underflow product of the feed, the density of the fluid is decreased, the water levels in the reservoirs 24 fall, lowering the floats 25 and thereby causing an increase in the volume of water supplied to reservoirs 24 through the pipes 29. This results in an increase in the velocity of the upward currents through pipes 5 into the tanks 1, causing a retarding of the discharge of the underflow product from tanks 1. It is obvious that this automatic control of the upward currents through pipes 5 produces the desired hydraulic separation in the pipes 5, the currents being increased when the overflow product increases with the decrease of the underflow product, and the currents being decreased when the overflow product decreases with the increase of the underflow product. This operation of that particular portion of my apparatus assists in securing the control of the density of the fluid in tanks 1, to produce the desired degree of specific gravity of the fluid so that it shall produce the desired separation of the overflow and the underflow products.

As above described, the feed to the tanks 101 of units B is supplied through pipes 23 from sumps 20. The materials entering the tanks 101 are subjected to the treatment disclosed and claimed in my co-pending application Serial Number 249,817, viz. "The segregation of overflow and underflow products by hydraulic separation in each of three stages of the process," as now will be fully described.

The impeller 115 in casing 110 being actuated by the motor 118 induces a flow of water from tank 101 into the intake 127 of the casing 110 and therefrom through pipe 111, pipes 112, and out through nozzles 113. As is well known, the emission of the liquid from the nozzles 113 causes rotation of pipe 111, thereby causing rotation therewith of head 120 and its nozzles 122 in the chamber 103. The circulation of water through tanks 101 creates an upwardly flowing current, in each tank 101.

The overflow product passes out of tanks 101, through launders 146 to pipes 147, and its further treatment in unit C will presently be explained.

The middling product of tanks 101 passes out of tanks 101 through the pipes 125 onto screens 128 having screen cloth of 28 mesh. The particles, fine coal, larger than 28 mesh will pass over these screens 128 and through pipe 129 to the drying device 134. The particles which are finer than 28 mesh pass through the screens 128 into sumps 130 and therefrom through pipes 131 to the intake of pumps 133. It is to be noted that the liquid removed from the product, clean coal, in the drying device 134 is conveyed through pipe 137 to the intake of the pumps 133. The discharge of the pumps 133 is supplied through pipes 138 to sumps 20 of units A, as above mentioned.

The underflow product from tanks 101 passes to chambers 103. By the suitable adjustment of the valves 124 in pipes 123, water is supplied from tank 222, in regulated amounts, to heads 120, pipes 121 and out through nozzles 122, creating a second upwardly flowing current causing hydraulic classification of the mixed underflow from the tanks 101. This upwardly flowing current is so controlled as to cause the desired overflow product to be separated out and pass from the chambers 103 to tanks 101 to be retreated therein. The underflow product of chambers 103 passes downwardly into pipes 105 to casings 106 of the conveyors 107. By means of pipes 144 water is supplied from tank 222 to reservoirs 140 and therefrom to casings 106, whereby a third upwardly flowing current can be created, through pipes 105, causing hydraulic separation of the mixed underflow product from chambers 103, resulting in the overflow product returning to chambers 103 for retreatment, the underflow product of this third current, slate particles, passing to casings 106 to be discharged by conveyors 107 to waste.

It is obvious that variations in the density of the fluid circulated in tanks 101 and chambers 103 result in variations of this third current passing through pipes 105, in a manner similar to the automatic variation of the flow through the pipes 5 of tanks 1 in units A.

As above mentioned the overflow product of tanks 101 flows through pipes 147, and thence to pipes 21 to join the overflow from sumps 20 of units A, and be discharged by pipe 21 into tank 201 of unit C.

The character and operation of unit C are that of my improved apparatus described and claimed in United States Letters Patent Number 1,767,227. The operation of impeller 211 by the motor 214 induces a flow of the liquid in tank 201, through casing 206, pipe 207, pipes 208 and their nozzles 209, emission of the liquid from the nozzles 209 causing rotation of pipe 207, pipes 208 and their nozzles 209. This circulation of the liquid creates an upwardly flowing current in tank 201 causing hydraulic separation from the liquid of such particles of the fine coal as may have been carried by the overflowing liquid from the sumps 20 of units A and the launders 146 of units B. This underflow product of unit C passes downwardly from tank 201, through pipe 203, into the filter 218, and the filtered coal particles pass therefrom through discharge 219, to be added to the dried clean coal product discharged from the drying device 134 to constitute the desired final product of my improved process. The liquid discharged from filter 218 which, having been freed of all coal particles by action of the filter 218, is now clear water, passes through pipe 220 to the intake of pump 217. The clear water overflowed from tank 201, passing through launder 215 and pipe 216, is also fed to the intake of pump 217, and the discharge from pump 217 passes through pipe 221 to the supply tank 222.

I will now describe the use and operation of the modified forms of sumps 20' and 20" illustrated in Figs. 5 and 6 respectively, for use with unit A of my apparatus. As above pointed out, the sump 20' is positioned under the screen 18 and so receives the particles less than 1/8 inch passing through the screen 18. It is obvious that as these particles settle in the sump 20', passing along the downwardly sloping bottom, there occurs a horizontal classification, the heavier particles settling to be received into the depending chamber 23', then through pipe 23" to unit B (Fig. 7), and the lighter particles passing to the forward end of the sump 20' to be drawn through pipe 22' by pump 16 and returned to tank 1 (Fig. 7). Likewise in sump 20" the heavier particles passing along the sloping bottom 23—a and over its end 23c are trapped by wall 23—d to pass out through pipe 23—e to unit B, and the lighter particles passing over the upper end of wall 23—d to the forward end of sump 20" are drawn through pipe 22" by pump 16 and returned to tank 1. Thus, it is obvious that by the use of either of these modified forms of sumps, with unit A, I secure a separation of the screened particles, according to specific gravity. The materials stratify, in horizontal flow through the sump, the heavier particles going to unit B and the lighter particles returning to tank 1 of unit A. The functioning of these sumps, as above described, supplies an additional step in the separation of the materials in unit A. Thus the functioning of each unit A practices three distince separation steps, viz. (1) the hydraulic separation in tank 1 by the upwardly flowing current therein causing hindered settling action, (2) the horizontal stratification on the screens 18, and (3) the horizontal stratification in sumps 20' or 20". From the foregoing description of the operation of unit A, with either of the modified forms of sumps, it is obvious that in that particular stage of my improved process two effects are produced:

1. Sizing within the cleaning process.
2. Concentration of undersize for retreatment in the next stage.

I will now describe the distribution of the materials by the process heretofore described. As above mentioned, the mixed materials are fed to units A at the rate of 550 tons per hour. At this rate of feed, the discharge of clean coal from screens 18 is at the rate of 360 tons per hour, the discharge of the slate by the conveyors 7 is at the rate of 40 tons per hour, and the feed from sumps 20, 20' or 20" to units B is at the rate of 150 tons per hour. The discharge of the clean coal from units B is at the rate of 135 tons per hour, and the discharge of slate from units B is at the rate of 15 tons per hour. As the clean coal from units A and units B pass together through the drying device 134, the total discharge therefrom is at the rate of 495 tons per hour, as the final desired product of my process, the total slate discharge being at the rate of 55 tons per hour.

I will now describe the rate of flow of the water used in the foregoing described process. The supply tank 222 discharges 830 gallons per minute, of this 580 gallons per minute is returned through pipe 221, and the balance, 250 gallons per minute, is supplied to the tank 222 by any suitable means. Units A are supplied, through pipes 32 and their spray heads on the feed with 530 G. P. M., through pipes 29 to reservoirs 24 with 100 G. P. M., and by pumps 133 of units B through pipes 138 with 1740 G. P. M., making a total of 2370 G. P. M. which is discharged from units A, over screens 18 at the rate of 260 G. P. M., overflow of sumps 20, 20' or 20" at the rate of 250 G. P. M., underflow of sumps 20, 20' or 20" at the rate of 1800 G. P. M., and discharge by elevators 7 at the rate of 60 G. P. M., a total of 2370 G. P. M. Units B are supplied through feed pipes 145 at the rate of 1800 G. P. M., through supply pipes 123 at the rate of 100 G. P. M., and through pipes 144 from tank 222 to reservoirs 139 at the rate of 100 G. P. M., making a total of 2000 G. P. M. which is discharged from units B, over screens 128 at the rate of 180 G. P. M., underflow of sumps 130 at the rate of 1440 G. P. M., overflow through launders 146 at the rate of 350 G. P. M., and discharge by elevators 107 at the rate of 30 G. P. M., making a total of 2000 G. P. M.

It is to be noted that the water discharged over screens 18 and screens 128 flows at the rate of 260 and 180 G. P. M., respectively, making a flow with the clean coal into the drying device 134 of 440 G. P. M., of which a flow of 140 G. P. M., escapes from the drying device 134 with the clean coal, and a flow of 300 G. P. M. is drawn from the drying device 134 by pumps 133 to join the flow of 1440 G. P. M. from sumps 130, so that the pumps 133 supply to sumps 20, 20' or 20" a flow of 1740 G. P. M., as above stated.

Unit C is supplied through pipe 21 with a flow of 600 G. P. M., being the combination of the overflow of 250 G. P. M. from sumps 20, 20' or 20", and the overflow of 350 G. P. M from launders 146 of units B, as above mentioned. This flow of 600 G. P. M. is discharged from unit C through pipe 203 at the rate of 150 G. P. M., and through launder 215 at the rate of 450 G. P. M.

It is to be noted that the flow from unit C through pipe 203 passes to filter 218 from which there is an escape of water with the filtered particles at the rate of 20 G. P. M., the residue being drawn by pump 217 at the rate of 130 G. P. M. to join the aforesaid flow from launder 215, so that the pump 217 supplies through pipe 221 to the tank 222 a flow of 580 G. P. M., as above explained.

From the foregoing, it will be understood that the tank 222 supplies through pipes 29 a flow of 100 G. P. M. into reservoirs 24 of units A, through pipes 32 a flow of 530 G. P. M. to the spray heads for the feed to units A, through pipes 123 a flow of 100 G. P. M. to units B, and through pipes 144 a flow of 100 G. P. M. to reservoirs 139 of units B, making a total flow from tank 222 of 830 G. P. M. Of this flow of 830 G. P. M. from tank 222, as we have seen, there is a return flow through pipe 221 of 580 G. P. M., and the balance, 250 G. P. M., is lost, in the following manner; escapes from drying device 134 a flow of 140 G. P. M., escapes from elevators 7 a flow of 60 G. P. M., escapes from elevators 107 a flow of 30 G. P. M., and escapes from filter 218 a flow of 20 G. P. M., making the total of 250 G. P. M.

Having described my invention what I claim is:

1. The process of separating mixed materials which consists in subjecting the materials to the classifying effect of an upwardly flowing current of a fluid medium, thereby segregating the overflow and underflow products; discharging the underflow product to waste; screening the overflow product; discharging the oversize portion of said overflow product; causing stratification of the undersize portion, to form at least two strata; introducing an upper stratum into said current; subjecting the lowest stratum to the classifying effect of an upwardly flowing current of a fluid medium, thereby producing an overflow product, a middling product and an underflow product; discharging separately the overflow and the underflow products; screening the middling product; discharging the oversize portion of said middling product; and adding the undersize portion of said middling product to the undersize portion of the overflow product of the first mentioned current.

2. The process of separating mixed materials which consists in subjecting the materials to the classifying effect of an upwardly flowing current of a liquid medium, thereby segregating the overflow and underflow products; discharging the underflow product to waste; screening the overflow product; discharging the oversize portion of said overflow product; causing stratification of the undersize portion, to form upper, middle and lower strata; introducing the middle stratum into said current; subjecting the lower stratum to the classifying effect of an upwardly flowing current of a fluid medium, thereby producing an overflow product, a middling product and an underflow product; discharging the underflow product to waste; screening the middling product; discharging the oversize portion of said middling product; adding the undersize portion of said middling product to the undersize portion of the overflow product of the first mentioned current; combining the overflow product of said second current with the upper stratum of the undersize portion of the overflow product of the first current; subjecting said combined products to hydraulic separation by which the residue of solid material is separated from the overflowed liquid; and discharging the separated solid material.

3. In an apparatus for separating mixed materials, the combination of a tank having an overflow launder and an underflow discharge conduit; means adapted to cause hydraulic separation of mixed materials fed into said tank, to discharge the overflow product through said launder, and the underflow product through said conduit; a screen so disposed as to receive thereon the said overflow product; a sump below said screen and having an inclined bottom so disposed as to receive thereon the undersize portion of the overflow product and two chambers gradiently disposed below said bottom so disposed as to receive upper and lower strata of said undersize portion respectively; and a discharge pipe from the bottom of each of said chambers, the one of said discharge pipes from the chamber receiving the upper stratum being connected with the bottom of said tank.

4. In an apparatus for separating mixed materials, the combination of a tank having an overflow launder and an underflow discharge conduit; means adapted to cause hydraulic separation of mixed materials fed into said tank, to discharge the overflow product through said launder, and the underflow product through said conduit; a screen so disposed as to receive thereon the said overflow product; means adapted to cause stratification according to specific gravities of the undersize portion of the said overflow product which has passed through said screen, to form at least two strata of lesser and greater specific gravities respectively; a pipe adapted to convey an upper stratum of lesser specific gravity from said stratification means to the bottom of said tank; and a second pipe adapted to discharge the lowest stratum from said stratification means.

5. In an apparatus for separating mixed materials, the combination of a tank having an overflow launder and an underflow discharge conduit; means adapted to cause hydraulic separation of mixed materials fed into said tank, to discharge the overflow product through said launder, and the underflow product through said conduit; a screen so disposed as to receive thereon the said overflow product; means adapted to cause stratification according to specific gravities of the undersize portion of the overflow product which has passed through the screen, to form upper, middle and lower strata of lesser, intermediate and greater specific gravities, respectively; a pipe adapted to convey said middle stratum of intermediate specific gravity from said stratification means to the bottom of said tank; and two other pipes adapted to discharge said upper and lower strata, respectively, from said stratification means.

6. The process of separating mixed materials of different specific gravities which consists in subjecting the materials to the classifying effect of an upwardly flowing current of a fluid medium, thereby segregating overflow and underflow products of lesser and greater specific gravities respectively; discharging the underflow product to waste; screening the overflow product; discharging the oversize portion of said overflow product as one product of the process; causing stratification according to specific gravities of the undersize portion, forming upper, middle and lower strata of lesser, intermediate and greater specific gravities, respectively; introducing the middle stratum into the current for reclassification; and discharging the upper and lower strata, separately, as two more products of the process.

7. The process of separating mixed materials of different specific gravities which consists in subjecting the materials to the classifying effect of an upwardly flowing current of a fluid medium, thereby segregating overflow and underflow products of lesser and greater specific gravities respectively; discharging the underflow product to waste; screening the overflow product; discharging the oversize portion of said overflow product as one of the products of the process; separating the undersize portion of said overflow product into at least two portions of lesser and greater specific gravity; introducing one of said portions of lesser specific gravity into said current for reclassification; subjecting the portion of greatest specific gravity to the classifying effect of a second upwardly flowing current of a fluid medium, thereby producing an overflow product of lesser specific gravity, a middling product of intermediate specific gravity and an underflow product of greater specific gravity; discharging separately the said overflow and underflow products of said second current; screening the said middling product; discharging the oversize portion of said middling product as another product of the process; and returning the undersize portion of said middling product to be subjected to the aforesaid separating step in the process to which the undersize portion of the overflow product of the first current is subjected.

8. The process of separating mixed materials of different specific gravities which consists in subjecting the materials to the classifying effect of an upwardly flowing current of a fluid medium, thereby segregating overflow and underflow products of lesser and greater specific gravities, respectively, discharging the underflow product to waste; screening the overflow product; discharging the oversize portion of said overflow product as one of the products of the process; separating the undersize portion of said overflow product into three portions of differing specific gravities; introducing the one of said three portions having the medium specific gravity into said current for reclassification; subjecting the one of said portions having the greatest specific gravity to the classifying effect of a second upwardly flowing current of a fluid medium, thereby producing an overflow product of lesser specific gravity, a middling product of intermediate specific gravity and an underflow product of greater specific gravity; discharging the underflow product to waste; screening the middling product; discharging the oversized portion of said middling product as another of the products of the process; returning the undersize portion of said middling product to be subjected to the aforesaid separating step in the process to which the undersize portion of the overflow product of the first current is subjected; combining the overflow product of said second current with the one portion of the undersize portion of the overflowed product of the first current having the least specific gravity; subjecting said combined products to hydraulic separation by which the residue of solid material is separated from the overflowed liquid; and discharging the separated solid material as another product of the process.

9. The process of separating mixed materials which consists in subjecting the materials to the classifying effect of an upwardly flowing current of a fluid medium, thereby segregating overflow and underflow products; discharging the underflow product to waste; screening the overflow product; discharging the oversize portion of said overflow product as one of the products of the process; separating the undersize portion of said overflow product into three portions of differing specific gravities; introducing the one of said three portions having the medium specific gravity into said current; subjecting the one of said three portions having the greatest specific gravity to the classifying effect of an upwardly flowing current of a fluid medium, thereby producing an overflow product, a middling product and an underflow product; subjecting the underflow product to the classifying effect of an upwardly flowing current of water, thereby segregating overflow and underflow products; causing the overflow product of the current of water to re-enter the second upwardly flowing current of a fluid medium; subjecting the last mentioned underflow product to the classifying effect of a second upwardly flowing current of water joining said first current of water, thereby supplementing the effect of the first current of water by the classifying effect of the second upwardly flowing current of water, thereby segregating from the last mentioned underflow product any residue of light material not previously separated and retaining such light material in said first current of water; discharging the last mentioned underflow product to waste; screening the said middling product; discharging the oversize portion of said middling product as another product of the process; returning the undersize portion of said middling product to be subjected to the aforesaid separating step in the process in which the undersize portion of the overflow product of the first current of a fluid medium is subjected; combining the overflow product of the second current of a fluid medium with the one portion of the undersize portion of the overflow product of the first current of a fluid medium having the least specific gravity; subjecting said combined products to hydraulic separation by which the residue of solid material is separated from the overflowed liquid; and discharging the separated solid material as another product of the process.

10. In an apparatus for separating mixed materials of different specific gravities, the combination of a tank having an overflow launder and an underflow discharge conduit; means adapted to cause hydraulic separation of mixed materials fed into said tank, to discharge the overflow product of lesser specific gravity through said launder, and the underflow product of greater specific gravity through said conduit; a screen so disposed as to receive thereon the said overflow product, a sump below said screen; an overflow discharge means for said sump; a pipe from said sump connected with said hydraulic separation means; a second tank having an overflow launder, a discharge opening in its bottom, and a discharge pipe disposed in the wall of said second tank at a level between the levels of said launder and said opening respectively; a second pipe connecting the sump with the top of the second tank; means adapted to cause hydraulic separation of mixed materials of different specific gravities fed to said second tank through the pipe connected with the top thereof, to discharge the overflow product of lesser specific gravity through the launder of the second tank, the middling product of intermediate specific gravity through the discharge pipe of said second tank, and the underflow product of greater specific gravity through the discharge opening of said second tank; a second screen so disposed as to receive thereon the said middling product; a sump below said second screen, having a discharge pipe; and means adapted to convey the discharge of said second sump from its discharge pipe to the upper portion of said first sump.

11. In an apparatus for separating mixed materials of different specific gravities, the combination of a tank having an overflow launder and an underflow discharge conduit; means adapted to cause hydraulic separation of mixed materials fed into said tank, to discharge the overflow product of lesser specific gravity through said launder, and the underflow product of greater specific gravity through said conduit; a screen so disposed as to receive thereon the said overflow product; a sump below said screen and having an overflow pipe; a second pipe from said sump connected with said hydraulic separation means; a second tank having an overflow launder, a discharge opening in its bottom, and a discharge pipe disposed in the wall of said second tank at a level between the levels of said launder and said opening respectively; a third pipe connecting the sump with the top of said second tank; means adapted to cause hydraulic separation of mixed materials of different specific gravities fed to said second tank through the pipe connected therewith, to discharge the overflow product of lesser specific gravity through said launder of said second tank, the middling product of intermediate specific gravity through said discharge pipe of said second tank, and the underflow product of greater specific gravity through the discharge opening of said second tank; a second screen so disposed as to receive thereon the middling product; a sump below said second screen, having a discharge pipe; means adapted to convey the discharge of said second sump from its discharge pipe to the upper portion of said first sump; a third tank having an overflow launder and an underflow discharge pipe, and with which are connected the overflow pipe of the first sump and the launder of the second tank; and means adapted to cause hydraulic separation of material fed into said third tank from the first sump and the second tank, to discharge said material through the underflow discharge pipe of said third tank, and overflow the liquid from which said material has been separated, through the launder of the third tank.

12. In an apparatus for separating mixed materials of different specific gravities, the combination of a tank having an overflow launder and an overflow discharge conduit; means adapted to cause hydraulic separation of mixed materials fed into said tank, to discharge the overflow product of lesser specific gravity through the launder, and the underflow product of greater specific gravity through said conduit; a screen so disposed as to receive thereon the said overflow product; a sump below said screen and having an overflow pipe; a second pipe from said sump connected with said hydraulic separation means; a second tank having an overflow launder, a discharge opening in its bottom, and discharge pipe disposed in the wall of said second tank at a level between the levels of said launder and said opening respectively; a third pipe connecting the sump with the top of said second tank; means adapted to cause hydraulic separation of mixed materials of different specific gravities fed to said second tank through the pipe connected therewith, to discharge the overflow product of lesser specific gravity through said launder of said second tank, the middling product of intermediate specific gravity through the discharge pipe of said second tank, and the underflow product of greater specific gravity through said discharge opening of said second tank; a second screen so disposed as to receive thereon the said middling product; a sump below said second screen, having a discharge pipe; means adapted to convey the discharge of said second sump, from its discharge pipe to the upper portion of said first sump; a chamber disposed below said second tank and communicating through the discharge opening of said second tank, and having an underflow discharge pipe; means in said chamber adapted to cause hydraulic separation of materials of different specific gravities fed into said chamber from said second tank, to discharge the overflow product of lesser specific gravity into said second tank, and the underflow product of greater specific gravity through the discharge pipe of said chamber; a third tank having an overflow launder and an underflow discharge pipe, and with the top of which are connected the overflow pipe of the first sump and the launder of the second tank; and means in said third tank adapted to cause hydraulic separation of material fed into said third tank from the first sump and the second tank, to discharge said material through the underflow discharge pipe of said third tank, and overflow the liquid from which said material has been separated, through the launder of said third tank.

WALTER L. REMICK.

REFERENCES CITED

The following references are of record in the file of this patent:

UNITED STATES PATENTS

| Number | Name | Date |
| --- | --- | --- |
| 2,135,957 | Wuensch | Nov. 8, 1938 |
| 2,198,390 | Olney | Apr. 23, 1940 |
| 2,151,175 | Wuensch | Mar. 21, 1939 |
| 2,052,004 | Remick | Aug. 25, 1936 |
| 1,685,521 | Chance | Sept. 25, 1928 |
| 1,949,242 | Chance | Feb. 27, 1934 |